US011951559B2

(12) United States Patent
Glueck et al.

(10) Patent No.: US 11,951,559 B2
(45) Date of Patent: Apr. 9, 2024

(54) METHOD FOR PRODUCING AT LEAST ONE DEFINED CONNECTING LAYER BETWEEN TWO COMPONENTS OF DIFFERENT METALS

(71) Applicant: Bayerische Motoren Werke Aktiengesellschaft, Munich (DE)

(72) Inventors: Bernhard Glueck, Fuerstenfeldbruck (DE); Robert Kirschner, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 618 days.

(21) Appl. No.: 17/270,524

(22) PCT Filed: Oct. 1, 2019

(86) PCT No.: PCT/EP2019/076500
§ 371 (c)(1),
(2) Date: Feb. 23, 2021

(87) PCT Pub. No.: WO2020/088866
PCT Pub. Date: May 7, 2020

(65) Prior Publication Data
US 2021/0316389 A1    Oct. 14, 2021

(30) Foreign Application Priority Data
Oct. 29, 2018   (DE) ...................... 10 2018 126 914.5

(51) Int. Cl.
*B23K 15/00*   (2006.01)
*B23K 35/00*   (2006.01)
(Continued)

(52) U.S. Cl.
CPC .......... *B23K 15/008* (2013.01); *B23K 35/007* (2013.01); *B23K 35/0255* (2013.01);
(Continued)

(58) Field of Classification Search
CPC .... B23K 11/115; B23K 13/02; B23K 15/008; B23K 20/10; B23K 2101/34;
(Continued)

(56) References Cited

U.S. PATENT DOCUMENTS

| 8,883,318 B2 | 11/2014 | Yamamoto et al. |
| 2008/0241572 A1 | 10/2008 | Miyamoto et al. |

(Continued)

FOREIGN PATENT DOCUMENTS

| CN | 101274387 A | 10/2008 |
| CN | 101405105 A | 4/2009 |

(Continued)

OTHER PUBLICATIONS

International Search Report (PCT/ISA/210) issued in PCT Application No. PCT/EP2019/076500 dated Dec. 13, 2019 with English translation (five (5) pages).

(Continued)

*Primary Examiner* — Dana Ross
*Assistant Examiner* — Joseph W Iskra
(74) *Attorney, Agent, or Firm* — Crowell & Moring LLP

(57) ABSTRACT

A method produces at least one defined connecting layer between two components, wherein the first component is produced from a first metallic material and the second component is produced from a second metallic material and the first and/or second component has a coating of a third metallic material, the melting temperature of which is lower than the melting temperature of the first and second materials. In this case, the coating of at least one of the components is heated locally to a connecting temperature, which lies above the melting temperature of the third material and lies below the melting temperature of the first material and (Continued)

below the melting temperature of the second material, and is cooled down in order to form a defined connecting layer when the coating solidifies.

13 Claims, 2 Drawing Sheets

(51) Int. Cl.
  *B23K 35/02* (2006.01)
  *B23K 35/26* (2006.01)
  *B23K 35/28* (2006.01)
  *B23K 35/30* (2006.01)
  *B23K 101/34* (2006.01)
  *B23K 103/12* (2006.01)
  *B23K 103/18* (2006.01)

(52) U.S. Cl.
  CPC .......... *B23K 35/262* (2013.01); *B23K 35/282* (2013.01); *B23K 35/302* (2013.01); *B23K 2101/34* (2018.08); *B23K 2103/12* (2018.08); *B23K 2103/18* (2018.08)

(58) Field of Classification Search
  CPC ............ B23K 2103/12; B23K 2103/18; B23K 35/00; B23K 35/004; B23K 35/007; B23K 35/0255; B23K 35/26; B23K 35/262; B23K 35/28; B23K 35/282; B23K 35/30; B23K 35/302
  USPC ................................................... 219/121.14
  See application file for complete search history.

(56) References Cited

U.S. PATENT DOCUMENTS

| | | |
|---|---|---|
| 2009/0011269 A1 | 1/2009 | Urushihara et al. |
| 2010/0258537 A1 | 10/2010 | Sigler et al. |
| 2011/0123825 A1* | 5/2011 | Sakurai .................. B23K 26/22 |
| | | 219/148 |
| 2014/0144889 A1 | 5/2014 | Sakurai et al. |
| 2016/0067816 A1 | 3/2016 | Nicewonger |
| 2017/0008118 A1 | 1/2017 | Yang et al. |

FOREIGN PATENT DOCUMENTS

| | | |
|---|---|---|
| CN | 101856774 A | 10/2010 |
| CN | 101867098 A | 10/2010 |
| CN | 106334866 A | 1/2017 |
| CN | 107002896 A | 8/2017 |
| DE | 20 2014 104 871 U1 | 2/2016 |
| EP | 1 882 542 A1 | 1/2008 |
| EP | 1882542 * | 1/2008 |
| JP | 11-77337 A | 3/1999 |
| WO | WO 2010/022709 A1 | 3/2010 |

OTHER PUBLICATIONS

German-language Written Opinion (PCT/ISA/237) issued in PCT Application No. PCT/EP2019/076500 dated Dec. 13, 2019 (five (5) pages).

German-language Search Report issued in German Application No. 10 2018 126 914.5 dated Aug. 6, 2019 with partial English translation (13 pages).

English-language translation of Office Action issued in Chinese Application No. 201980055500.6 dated Dec. 7, 2021 (10 pages).

\* cited by examiner

METHOD FOR PRODUCING AT LEAST ONE DEFINED CONNECTING LAYER BETWEEN TWO COMPONENTS OF DIFFERENT METALS

BACKGROUND AND SUMMARY OF THE INVENTION

The invention relates to a method for producing at least one defined connecting layer between two components, wherein the first component is produced from a first metallic material and the second component is produced from a second metallic material, and the first and/or the second component comprises a coating composed of a third metallic material whose melting temperature is lower than the melting temperature of the first and of the second material.

For the connection, also small-area connection, of two components composed of different metallic materials, it is for example known to employ welding processes, such as, for example, spot welding, which are specifically adapted for the material combination. However, the components which are connected to one another are adversely affected in the process in particular owing to the high temperatures. For example, warpage of in particular thin-walled components is common, or the surface of the components is deformed or discolored in the region of the weld. Depending on the material combination, it is also difficult to produce a durable welded connection between two components composed of different materials.

By way of example, resistance soldering is known as a method for the small-area connection of two components composed of different metallic materials at at least one connecting point. In this case, a piece of soldering alloy is arranged in a fixed manner at the connecting point of one of the parts to be joined and is clamped between the two components to be connected together. The joining point is then for example brought between the electrodes of a spot-welding tool which is supplied with a low power, as a result of which the soldering alloy is melted and a soldered connection is produced. A disadvantage of the method described is the need to introduce and position a piece of soldering alloy at the connecting point, wherein the size and arrangement of the connecting point is influenced by the mass and the flow behavior of the soldering alloy introduced. The formation of an in particular geometrically defined connecting layer, for example of linear form, for the sealing of regions between two components is thus hardly possible.

Proceeding therefrom, it is the object of the invention to provide an improved method for connecting two components composed of different metals, said method making it possible to produce a connecting layer which is defined with respect to its two-dimensional extent. This is achieved according to the invention by the teaching of the independent claims. The subclaims provide advantageous embodiments of the invention.

In order to achieve the object, a method for producing at least one connecting layer, which is defined with respect to its two-dimensional extent, between two components is proposed, wherein the first component is produced from a first metallic material and the second component is produced from a second metallic material, and the first and/or the second component comprises a coating composed of a third metallic material whose melting temperature is lower than the melting temperature of the first and of the second material. The method comprises the following steps of:

locally heating the coating in a region which is predetermined for the production of the defined connecting layer to a connecting temperature which lies above the melting temperature of the third material and lies below the melting temperature of the first material and below the melting temperature of the second material;

interrupting the supply of energy as soon as the coating is at least partially melted in the region of the defined connecting layer;

cooling the at least partially melted coating in order to, during the solidification of said coating, form the connecting layer which is fixedly connected to the first component and fixedly connected to the second component and which is defined with respect to its two-dimensional extent.

Here, it is proposed that, during at least one of the method steps, the first component and the second component, with the coating arranged therebetween, are pressed against one another in the intended connecting position.

As a result of the fact that the proposed method utilizes a coating which is already present on at least one of the components over a large area for the production of the connecting layer, there is no need for any additional introduction of a connecting material. The local heating of the coating in a predetermined region to the connecting temperature also forms a connecting layer which is defined with respect to its two-dimensional extent and which is arranged at the intended position and has the intended shape and size. As a result of the fact that the connecting temperature lies below the melting temperature of the first and of the second material, warpage of the components and damage to the surface of the components which are connected to one another is also avoided.

In the proposed method, the first component is produced from a first metallic material and the second component is produced from a second metallic material. In principle, the method according to the invention can also be employed for connecting two components which are produced from the same metallic material. Such a material combination represents a special case of the proposed method. At least one of the first and/or second components comprises a coating composed of a third metallic material whose melting temperature is lower than the melting temperature of the first and of the second material, such that said third material can be melted or partially melted by way of the supply of heat energy without the melting temperature of the first and of the second material being reached. Rather thin-walled components are particularly suitable for the proposed method, that is to say those components which, in a joining position in which they bear against the other component, have a small thickness in relation to their total volume, such as, for example, metal sheets. Since the coating of thin-walled components can be readily locally heated and cooled again in the region in which a defined connecting layer is intended to be formed, the temperature in the predetermined region can be controlled in a desired manner.

In the method according to the invention, local heating of the coating is initially carried out in a region which is predetermined for the production of the connecting layer which is defined with respect to its two-dimensional extent. This local heating can for example be effected by means of a welding gun with an in particular reduced supply of energy or a similarly designed tool which for example has a predetermined electrode shape for locally heating a predetermined region, for example in order to produce a connecting layer with a predetermined geometric shape, such as in particular a circular or linear shape or some other shape designed in a component-dependent manner.

In this case, the local heating of the coating can be carried out after the first component has been arranged on the second component in the intended connecting position. The coating of at least one of the components is in this case arranged between the first and the second component. If both components comprise a coating, then the two coatings, which are preferably composed of the same material, bear against one another. If only one component comprises a coating, then the coating of the one component bears directly against the other component. In addition, in the case of a pressing-together operation which is possible in this case, the surface of the coating and the surface of the uncoated component, or the surfaces of the two coatings, are moved at least slightly in relation to one another. An accompanying relative movement between the surfaces leads to the breaking up of possible oxide layers and/or layers of impurities on the components, wherein the surfaces which bear against each other are activated.

In a similar manner, the local heating of the coating may also be carried out already before the first component is arranged on the second component in the intended connecting position. An advantage thereof is that, prior to the arrangement on the other component, the coating is readily accessible and can be heated directly.

By way of example, it is also possible for the method to be performed in particular in parallel with a forming of one or both components in a tool of a forming press, the press tool comprising a corresponding heating device. For the local heating of the coating, it is furthermore also possible, for example, to use tools which introduce microvibrations or micromovements into the connecting region, such as, for example, vibration or ultrasonic processes.

In this case, the coating is heated locally in the predetermined region to a connecting temperature. Here, in particular in the case of a coating with a sufficiently large thickness, it may suffice for the coating to be heated to the connecting temperature only in the region of its surface or in the region of part of the thickness of the coating rather than throughout. The connecting temperature lies in particular in a range from or above the melting temperature of the third material, which is the material of the coating, and below the melting temperature of the first and second materials, that is to say the melting temperature of the components which are connected to one another. Local heating of the coating to the connecting temperature can, due to the method, be associated with heating of the first and second components to a temperature equal to the connecting temperature or an even higher temperature in order to ensure that the coating is heated to the connecting temperature in the intended region. However, the temperatures in this case lie below the melting temperature of the first and second materials in order to prevent melting of the material of one of the components and thus a possible adverse effect on the components and on the quality of the connection.

In the next step, the supply of energy is interrupted as soon as the coating is at least partially melted in the region of the in particular geometrically defined connecting layer. The at least partially melted coating has substantially the geometric position and extent of the intended defined connecting layer when the supply of energy is interrupted, and therefore cooling of the at least partially melted coating forms the connecting layer at the desired position and with the desired extent.

The cooling of the melted coating in order to, during the solidification of the coating, form a connecting layer which is fixedly connected to the first component and fixedly connected to the second component and which is defined with respect to its two-dimensional extent can be effected by naturally occurring cooling processes, such as, for example, by heat radiation or heat conduction into the surrounding environment. In a similar manner, it is also possible for the cooling process to be assisted by suitable measures, the cooling means used being able to be for example air, water or nitrogen or even a cooling tool provided for this purpose.

During at least one of the method steps, the first component and the second component are pressed against one another with the coating arranged therebetween. In particular, in order to produce the connecting layer, the two components are pressed against one another with the locally at least partially melted coating arranged therebetween. In this case, the pressing pressure is also maintained at least during part of the subsequent cooling process in order to form the defined connecting layer. According to the invention, it is likewise possible for the first and the second component to also already be pressed against one another prior to or during the local heating of the coating, depending on the connecting layer to be formed and on the tools used. In this way, it is possible for the heat transfer between the components and into the coating to be improved. It is thus also possible to achieve a favorable relative movement between the components prior to the start of the heating operation. The two components are also held in a predetermined position at least during a period of the connecting operation.

To perform the proposed method, use can in particular be made of tools which are suitable for performing at least one or more of the method steps described.

Since the method according to the invention can be performed using a coating which has already been applied to one of the components, it is possible to produce a connection in a simple manner by locally heating said coating, without complex special processes and filler materials being required. In the method according to the invention, intracrystalline corrosion, which can occur for example during brazing, is also avoided as a result of the fact that the third material of the coating has a lower melting point than the first and second materials of the components. On account of the local limitation of the defined connecting layer and the small relative movement between the components which takes place as a result of the pressing operation, no additional auxiliary materials such as fluxes or the like are required, as a result of which it is possible to avoid undesired grain boundary diffusion which is promoted for example by fluxes.

In one embodiment of the method for connecting two components, the cooling of the at least partially melted coating is carried out substantially along a predefined time-temperature curve. As a result of suitable temperature control during the cooling of the melted coating, it is possible, on the one hand, to prevent a further region of the coating, said region going beyond the defined region, from possibly being melted by residual heat in the components, which then increases the extent of the defined connecting layer. Suitable temperature control also prevents the at least partially melted coating from escaping from the defined region, or from "flowing" out of said region, before said coating solidifies, as a result of which a connecting layer which does not correspond to the intended geometric extent could form. In particular, suitable temperature control during the cooling makes it possible for the solidification of the melted coating and thus the formation in particular of the microstructure of the connecting layer to be suitably controlled in order to form a high-quality connecting layer.

In one embodiment of the method, for the cooling of the melted coating, an active cooling process is employed in which use is made in particular of a cooling means, such as, for example, cooling air, cooling water, nitrogen, dry ice, at least one chill mold or a cooling tool which withdraws heat energy using a suitable physical effect. The use of at least one cooling means for dissipating heat energy from the connecting layer makes it possible to cool the defined connecting layer thus produced in a controlled manner, in particular also along a predetermined time-temperature curve.

In one embodiment of the method for connecting two components, the coating arranged on the first and/or on the second component is a functional coating of the component which in particular has the function of protecting the component against oxidation, for example. A functional coating which is customary for example in the case of steel components and which protects the component in particular against contact with atmospheric oxygen and thus against oxidation is a zinc layer, which can also comprise smaller proportions of other metals such as for example aluminum or magnesium in addition to zinc. Other functional coatings which are known for metal components and which are suitable for example for the proposed method are produced, in addition to zinc, in particular from copper, tin, brass or bronze or comprise at least a predominant proportion of one or more of these materials. An advantage here is that such a functional layer usually covers the surface of at least a part of or of the entire component, such that, with the proposed method, it is possible to form a connecting layer which is defined with respect to its two-dimensional extent at any suitable position on that surface of such a component which is provided with the coating.

In one embodiment of the method for connecting two components, the connecting layer which is defined with respect to its two-dimensional extent is of punctiform or linear configuration, wherein said layer has, in at least one direction, an extent of less than 5 mm, in particular of less than 3 mm, in particular of less than 2 mm and in particular of less than 1 mm. Such connecting layers produced with the proposed method can be used in a flexible manner for the connection of two components, in particular a plurality of corresponding connecting layers can be arranged in a simple manner at suitable positions between two components. A connecting layer which is described here as being "punctiform" is of course not limited to circular, square or rectangular geometries but rather can have any desired or required geometric shape. In addition to the connecting layer, it is furthermore also possible for the two components to be connected to have a different extent, such that the proposed method can be used to connect components of different size to one another. By way of example, the method according to the invention can also be used to fasten one or more small components, such as in particular washers or (micro) patches, to larger components.

In one embodiment of said method with a defined linear connecting layer, said layer has, in at least one direction, an extent of several millimeters or longer in relation to that surface of the at least one component on which said layer is arranged. Such connecting layers can represent connecting seams between the components, said seams also being able, depending on their arrangement, to be used for sealing purposes between the components which are connected to one another.

In one embodiment of the method for connecting two components, the heating of the coating in the predetermined region is effected by means of a tool which introduces energy into the coating at the connecting position. In this case, the energy can be introduced for example by means of resistance heating, induction heating, vibration-induced heating, ultrasonic heating or lift ignition. For this purpose, tools such as for example welding guns are suitable, by means of which heat energy can be locally introduced, in a manner limited to a region, into the coating of components in order to melt or partially melt said coating in a local manner and adjust the supply of heat after the coating has been melted or partially melted in a local manner. It is furthermore also possible for the pressing pressure required for pressing the two components against one another to be applied by a tool such as a welding gun. In particular, a tool configured in this way can be used to press the two components against one another in parallel with the performance of one or more of the method steps.

In one embodiment of the method for connecting two components, the heating of the coating, and also the cooling of the at least partially melted coating, for the production of the defined connecting layer are effected by a tool which has both a heating and a cooling function. As a result of the use of such a tool, such as, for example a so-called variotherm tool, the method can be performed in a particularly economical manner. The use of tools of this kind allows the method to be performed in a suitable manner, in particular also in a manner which is favorable in terms of time and/or energy. Depending on the properties of the tool used, the heating and/or cooling of the coating can thus be carried out substantially along a predefined time-temperature curve.

In one embodiment of the method for connecting two components, the heating of the coating for the production of the connecting layer is effected by means of a tool which locally heats the coating in the predetermined region. As a result of the fact that the coating is locally heated in accordance with the shape and dimensions of the predefined connecting layer, said coating is melted in accordance with the desired shape and dimensions, whereby the connecting layer has the predetermined shape and dimensions after cooling.

In one embodiment of the method for connecting two components, the heating of the coating, and also the cooling of the at least partially melted coating, for the production of an in particular linear connecting layer is effected progressively along the predetermined region. As a result of suitable construction or guidance of a tool with a heating device over the surface of at least one of the two components which are arranged against one another, the coating which is arranged between the components is progressively locally melted and solidified, such that the defined two-dimensional extent of the connecting layer can in this way be designed in a largely free and flexible manner. The proposed method can thus be used to form freely defined connecting and/or sealing seams between two components which are arranged against one another.

In one embodiment of the method for connecting two components, the tool or a heating device or electrode arranged thereon for heating the coating is tapered at the contact surface on a component, in particular is of conical, wedge-shaped or blade-like configuration. On account of the contact surface which is more defined as a result of the tapering, a tool configured in this way is particularly suitable for locally heating a limited region of the component or a coating, which is arranged between two components, in a predetermined region in order to produce a connecting layer which is defined with respect to its two-dimensional extent.

In a second aspect, in order to achieve the object, a composite component is proposed which is produced, in particular by a method according to the description above, from at least two components which are connected together. The composite component comprises at least one connecting layer which is arranged between two components and which is defined with respect to its two-dimensional extent. The first component is produced from a first metallic material and the second component is produced from a second metallic material, and the first and/or the second component comprise a coating composed of a third metallic material whose melting temperature is lower than the melting temperature of the first and of the second material. The defined connecting layer of the composite component is produced with the third metallic material from the coating of the first component and/or of the second component.

The composite component comprises one or more connecting layers which are defined with respect to their two-dimensional extent and is produced by a method having at least one or more features of the method described above. Correspondingly, the composite component also comprises at least one or more features of the connecting layer, which emerge in conjunction with the above description of the method for producing such a connecting layer.

Further features, advantages and use possibilities of the invention emerge from the following description in conjunction with the figures.

DETAILED DESCRIPTION OF THE DRAWINGS

FIGS. 1a to 1d show schematic illustrations of an exemplary illustration of a method for producing at least one defined connecting layer 20 between two components, wherein the first component 11 is produced from a first metallic material and the second component 12 is produced from a second metallic material, and the first component 11 comprises a coating 13 composed of a third metallic material whose melting temperature is lower than the melting temperature of the first and of the second material.

Figure 1A:
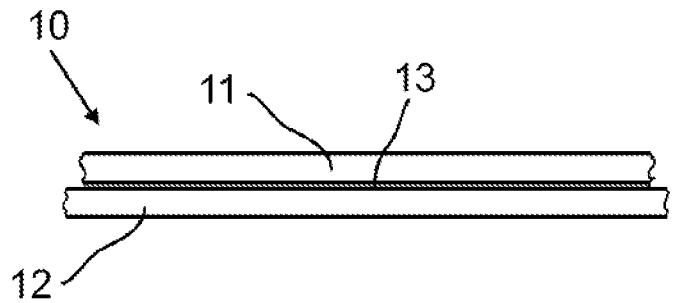
FIGS. 1a to 1d are schematic illustrations of an exemplary sequence of the method according to the invention.

In FIG. 1a, the first component 11 is arranged on the second component 12 in the intended connecting position. The coating 13 of the first component 11 lies between the first and the second component.

Figure 1B:
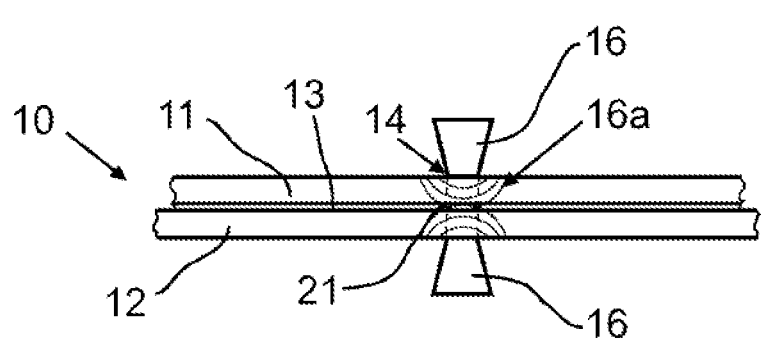

As illustrated in FIG. 1b, in this exemplary embodiment the coating 13 is locally heated by means of resistance heating by two electrodes 16 which are supplied with an electric current. The propagation of the heat is indicated by dotted lines 16a. The coating 13 is thus heated in a region 21, indicated by dashed lines between the electrodes 16, which is predetermined for the production of the connecting layer 20 which is defined with respect to its two-dimensional extent, to a connecting temperature which lies above the melting temperature of the third material and lies below the melting temperature of the first and second materials. The tool 16 for heating the coating 13 is in this case configured in a conically tapered manner at the contact surface 14 on the first component 11.

Figure 1C:
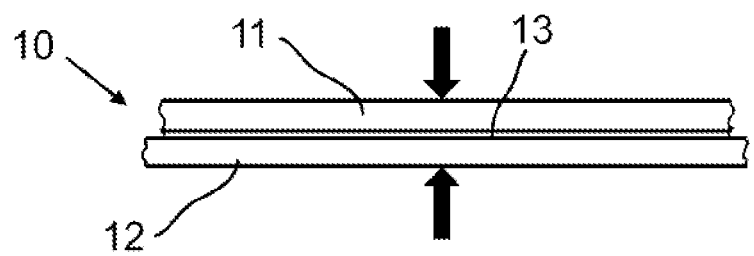

FIG. 1c shows an operation for pressing the first component 11 and the second component 12 against one another with the coating 13 arranged therebetween. The pressing-together operation can be effected, for example, with a tool which is specifically provided for this step or else with a tool with which heat energy is introduced into the coating 13. Although the pressing of the two components 11 and 12 against one another is illustrated in FIG. 1c as being subsequent to the local heating of the coating 13, shown in FIG. 1b, it is possible for the components 11 and 12 to be pressed against one another during several method steps and in particular also already as of the local heating of the coating.

Figure 1D:
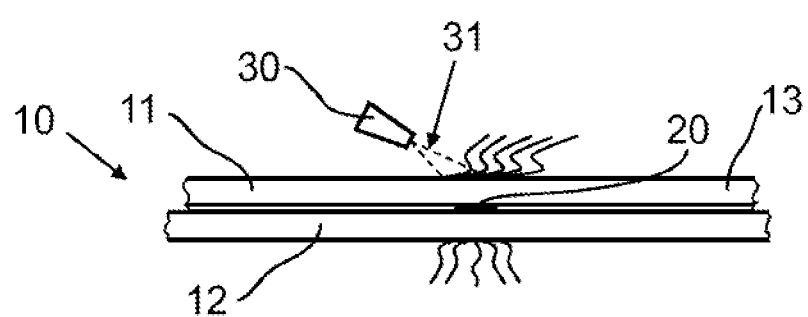

If the coating 13 in the region 21 of the defined connecting layer 20 has reached the connecting temperature and is at least partially melted, the supply of energy is stopped. After the supply of energy has been interrupted, the at least partially melted coating 13 is cooled in order to, during the solidification of the coating 13, form the connecting layer 20 which is fixedly connected to the first component 11 and fixedly connected to the second component 12 and which is defined with respect to its two-dimensional extent. In order to assist the cooling, cooling means can be employed, as is shown in FIG. 1d. In the exemplary embodiment, the surface of the first component 11 is cooled by means of an air flow 31 which is directed onto the surface by a nozzle 30 in order to achieve suitable temperature control during the solidification of the connecting layer 20.

Figure 2:
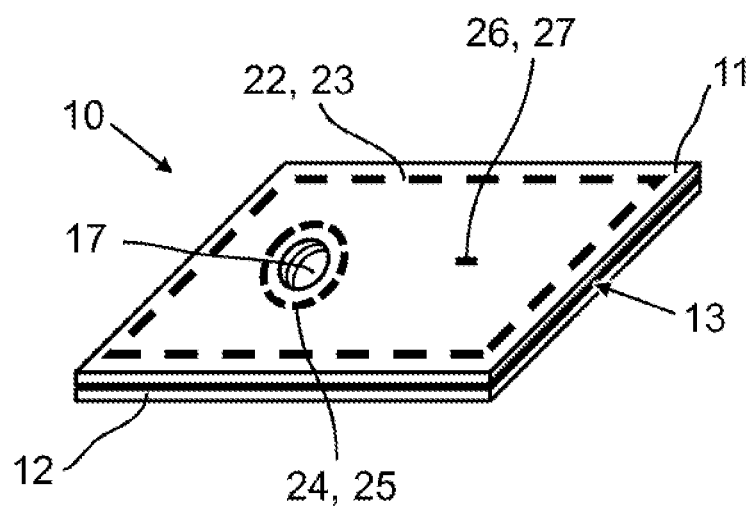
FIG. 2 is a schematic illustration of an exemplary composite component according to the invention.

FIG. 2 shows a schematic illustration of an exemplary composite component 10 with connecting layers arranged thereon in exemplary fashion. The composite component is produced from a first component 11 and a second component 12 and has three exemplary connecting layers 22, 24 and 26 between the first and second components 11, 12. The component 12 is provided over a large area with a functional coating 13 as corrosion protection, which is arranged between the components 11, 12.

The two components 11, 12 are connected to a linear defined connecting layer 22 which runs around the composite component 10 and for the production of which the coating 13 was locally heated in the predetermined region 23, illustrated by dashed lines, in order to obtain the shape which is defined with respect to its geometric two-dimensional extent. By way of example, the heating can in this case be effected by means of a tool which is guided progressively over the surface of the first and/or second component 11, 12, or for example also by means of a wedge-shaped or blade-like tool which is designed in a linear manner correspondingly to the required length or a partial length of the predetermined region 23.

The composite component 10 also comprises an opening 17 which is sealed against the ingress of fluids or similar by means of a circular defined connecting layer 24. In order to produce the connecting layer 24, the coating 13 was locally heated in the predetermined region 25, illustrated by dashed lines, in order to obtain the shape which is defined with respect to its geometric two-dimensional extent. In order to heat the predetermined region 25, a wedge-shaped or blade-like tool, for example, can be employed in a circular shape.

The composite component 10 also comprises a substantially punctiform connecting layer 26 in order to reinforce the connection between the first and second components 11, 12. In order to produce the connecting layer 26, the coating 13 was locally heated in the predetermined region 27 by means of a punctiform heat source in order to obtain the defined shape.

Figure 3:
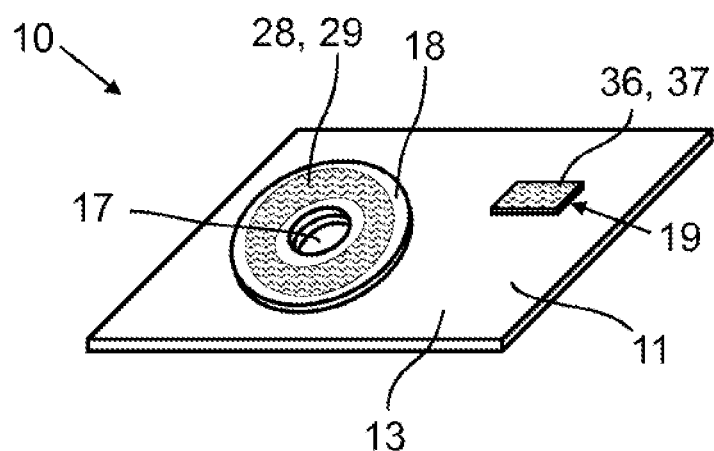
FIG. 3 is a schematic illustration of a further exemplary composite component according to the invention.

FIG. 3 shows a schematic illustration of a further exemplary composite component 10 with connecting layers arranged thereon in exemplary fashion. The composite component 10 illustrated in FIG. 3 is produced from a first component 11 which comprises a coating 13. The composite component 10 in FIG. 3 also comprises an opening 17 which is reinforced with a second component, fastened to the first component 11, in the form of a disk 18. The disk 18 is fastened to the first component 11 by means of a connecting layer 28. In order to produce the connecting layer 28, the coating 13 was locally heated in the predetermined region 29, illustrated in a hatched manner, in order to obtain the predefined circular ring shape.

Furthermore, arranged on the first component 11 is a second component, fastened by means of a connecting layer 36, in the form of a patch 19. The patch 19 is fastened to the first component 11. In order to produce the connecting layer 36, the coating 13 was locally heated in the predetermined region 37, illustrated in a hatched manner, in order to obtain the predefined shape correspondingly to the dimensions of the patch 19.

LIST OF REFERENCE DESIGNATIONS

10 Composite component
11 First component
12 Second component
13 Coating
14 Contact surface
16 Electrodes
16a Heat propagation
17 Opening
18 Disk
19 Patch
20 Connecting layer
21 Predetermined region
22 Connecting layer
23 Defined region
24 Connecting layer
25 Defined region
26 Connecting layer
27 Defined region
28 Connecting layer
29 Defined region
30 Nozzle
31 Air flow
36 Connecting layer
37 Defined region

What is claimed is:

1. A method for producing at least one connecting layer, which is defined with respect to its two-dimensional extent, between two components, wherein the first component is produced from a first metallic material and the second component is produced from a second metallic material, and the first and/or the second component comprises a coating composed of a third metallic material whose melting temperature is lower than the melting temperature of the first and of the second material, the method comprising the steps of:

locally heating the coating in a region which is predetermined for production of the defined connecting layer to a connecting temperature which lies above the melting temperature of the third material and lies below the melting temperature of the first material and below the melting temperature of the second material;

interrupting a supply of energy as soon as the coating is at least partially melted in the region of the defined connecting layer;

cooling the at least partially melted coating in order to, during solidification of the coating, form the defined connecting layer which is fixedly connected to the first component and fixedly connected to the second component and which is defined with respect to its two-dimensional extent, wherein, during at least one of the above steps, the first component and the second component, with the coating arranged therebetween, are pressed against one another in an intended connecting position, wherein the heating of the coating, and also the cooling of the at least partially melted coating, for the production of the defined connecting layer is effected by a tool which has both a heating and a cooling function.

2. The method according to claim 1, wherein
the cooling of the at least partially melted coating is carried out substantially along a predefined time-temperature curve.

3. The method according to claim 1, wherein
for the cooling of the at least partially melted coating, an active cooling process is employed, using a cooler.

4. The method according to claim 3, wherein
the cooler comprises cooling air, cooling water, nitrogen, dry ice, at least one chill mold or a cooling tool.

5. The method according to claim 1, wherein
the coating arranged on the first component and/or on the second component is a functional coating, which is produced in from zinc, copper, tin, brass or bronze materials or comprises at least a predominant proportion of one or more of said materials.

6. The method according to claim 1, wherein
the connecting layer which is defined with respect to its two-dimensional extent is of punctiform or linear configuration, and has, in at least one direction, an extent of less than 5 mm.

7. The method according to claim 1, wherein
the connecting layer which is defined with respect to its two-dimensional extent is of punctiform or linear configuration, and has, in at least one direction, an extent of less than 1 mm.

8. The method according to claim 6, wherein
the linear configured connecting layer has, in at least one direction, an extent of several millimeters in relation to that surface of the at least one component on which said layer is arranged.

9. The method according to claim 1, wherein
the locally heating of the coating in the predetermined region is effected by the tool which introduces energy into the coating, and
the energy is introduced by resistance heating, induction heating, vibration-induced heating or ultrasonic heating.

10. The method according to claim 1, wherein
the heating of the coating for the production of the defined connecting layer is effected by the tool which heats the coating in accordance with a shape and dimensions of the defined connecting layer.

11. The method according to claim 1, wherein
the heating of the coating, and also the cooling of the at least partially melted coating, for the production of a linear connecting layer is effected progressively along the predetermined region.

12. The method according to claim 1, wherein the tool for heating the coating is tapered at a contact surface on a component.

13. The method according to claim 12, wherein the tool has a conical, wedge-shaped or blade-shaped configuration.

\* \* \* \* \*